United States Patent [19]

Arbit

[11] 4,445,991
[45] * May 1, 1984

[54] ENHANCED WETTABILITY OF ORGANIC SURFACES

[75] Inventor: Harold A. Arbit, Highland Park, N.J.

[73] Assignee: Mobil Oil Corporation, New York, N.Y.

[ * ] Notice: The portion of the term of this patent subsequent to Jul. 6, 1999 has been disclaimed.

[21] Appl. No.: 440,651

[22] Filed: Nov. 10, 1982

[51] Int. Cl.$^3$ .............................................. C07C 3/24
[52] U.S. Cl. .................................... 204/168; 204/165
[58] Field of Search ................................ 204/165, 168

[56] References Cited

U.S. PATENT DOCUMENTS 3,526,583  9/1970  Hayward ........................... 204/165
3,661,735  5/1972  Drelich .............................. 204/165
3,925,178  12/1975  Gesser et al. ...................... 204/165
4,072,769  2/1978  Lidel .................................. 204/165
4,297,187  10/1981  Deguchi et al. .................... 204/165
4,338,420  7/1982  Arbitt ................................. 525/388
4,374,694  2/1983  Blenner .............................. 204/165

*Primary Examiner*—John F. Niebling
*Attorney, Agent, or Firm*—Alexander J. McKillop; Michael G. Gilman; James P. O'Sullivan, Sr.

[57] ABSTRACT

This invention provides a method for enhancing wettability of an organic surface which is at least comparatively hydrophobic which comprises subjecting said surface to plasma surface treatment using a gaseous medium selected from the group consisting of oxygen, argon, nitrous oxide, air and mixtures thereof.

4 Claims, No Drawings

ENHANCED WETTABILITY OF ORGANIC SURFACES

BACKGROUND OF THE INVENTION

This invention is concerned with organic surfaces having enhanced wettability and printability.

Conventional surface treatments for polyolefin films include corona-discharge, flame or chemical treatment. In so far as is now known, plasma treatment of comparatively hydrophobic organic surfaces has not been proposed.

SUMMARY OF THE INVENTION

This invention provides a method for enhancing the wettability of an organic surface which is at least comparatively hydrophobic comprising subjecting said surface to a plasma surface treatment using a gaseous medium selected from the group consisting of oxygen, argon, nitrous oxide, air and mixtures thereof. It is preferred that the organic surface is a polymer surface. Among the preferred polymer surfaces is a member selected from the group consisting of a polyolefin, polyethylene terephthalate and polyacrylonitrile homopolymer.

DESCRIPTION OF SPECIFIC EMBODIMENTS

Improved wettability of organic surfaces such as polymer films, enhances the ability to print, coat, and/or bond them. Wettability, as is well known, is measured by the contact angle of distilled water with the film. Small contact angles, i.e. flat drops, indicate good wetting, whereas large angles, i.e. round drops, show poor wetting. By the method of this invention, the wettability of organic surfaces, for example, high density polyethylene, is greatly enhanced.

High density polyethylene is well known in the art and is commercial available in bulk and in the form of film, usually biaxially oriented. Polymerization of ethylene to high density polyethylene is carried out at low pressure in the presence of a Ziegler-Natta coordination catalyst.

As used herein, plasma is a high temperature, ionized gas composed of electrons and positive ions in such relative numbers that the gaseous medium is essentially electrically neutral. By high temperature is meant any temperature above ambient or standard room temperature up to a point below the decomposition temperature of the organic surface or the softening temperature of the polymer. It is preferred that the temperature be above about 100° F. The gaseous media found most effective within the contemplation of this invention are a gaseous medium selected from the group consisting of oxygen, argon, nitrous oxide, air and mixtures thereof.

EXAMPLE

Films of oriented high density polyethylene, biaxially oriented polypropylene, polyethylene terephthalate and polyacrylonitrile homopolymer were subjected to plasma surface treatment using oxygen, argon, nitrous oxide, and air environments. After plasma processing, contact angles were measured with distilled water and compared with untreated controls. Results are set forth in the Table.

TABLE

Effect of Plasma Surface Treatment on Wettability Control Angle, Degrees with Distilled Water

|  | Control | Oxygen | Argon | Nitrous Oxide | Air |
| --- | --- | --- | --- | --- | --- |
| Polyethylene | 90 | 43 | 43 | 60 | 50 |
| Polypropylene | 90 | 65 | 55 | 57 | 65 |
| Polyethylene Terephthalate | 70 | 45 | 45 | 42 | 38 |
| Polyacrylonitrile | 47 | 38 | 37 | 35 | 35 |

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A method for enhancing the wettability of an organic surface which is at least comparatively hydrophobic comprising subjecting said surface to a plasma surface treatment using a gaseous medium selected from the group consisting of oxygen, argon, nitrous oxide, air and mixtures thereof said plasma treatment including converting said gaseous medium into ionized gas composed of electrons and positive ions in such relative numbers that the gaseous medium is essentially neutral, at a temperature between ambient or standard room temperature and below the decomposition temperature or softening temperature of said organic surface.

2. The method of claim 1 wherein said surface is a polymer surface.

3. The method of claim 2 wherein said polymer surface is a member selected from the group consisting of a polyolefin, polyethylene terephthalate and polyacrylonitrile homopolymer.

4. The method of claim 3 wherein said polyolefin is oriented polypropylene.

* * * * *